Aug. 7, 1962 F. I. GEWICKEY ET AL 3,048,327
INFORMATION REPRODUCING SYSTEM
Filed July 12, 1960 4 Sheets-Sheet 2

FIG. 2

United States Patent Office 3,048,327
Patented Aug. 7, 1962

3,048,327
INFORMATION REPRODUCING SYSTEM
Frank I. Gewickey, Fishkill, Robert K. Golden, Peekskill, and Bernard M. Muenzer, Hyde Park, N.Y., assignors to International Business Machines Corporation, New York, N.Y., a corporation of New York
Filed July 12, 1960, Ser. No. 42,247
14 Claims. (Cl. 234—16)

The present invention is directed to information reproducing systems and to the methods of removing information from one record and reproducing it on a different record. More particularly, the invention relates to a system for concurrently scanning or reading item and quantity information appearing on both sides of a moving series of joined warehouse order forms and translating that information to a utilizing means such as a pair of card punches, each of which provides a punched card output that constitutes a reproduction of individual orders.

In some types of business operations, sales representatives take orders for various products which constitute items in a large array of manufactured commodities. From time to time the representative prepares a total of individual items which have been sold, marks those totals on an order form, and forwards the latter to a warehouse where the order is filled. Heretofore, there has existed a serious need at the warehouse for apparatus capable of expeditiously handling the quantity and item information appearing on such forms so that the orders could be processed, records accurately made, and the merchandise forwarded promptly to the sales representatives.

It is an object of the present invention, therefore to provide a new and improved information reproducing system which is particularly adapted for use in the environment just described.

It is another object of the invention to provide a new and improved information reproducing system for removing information from a record and translating it to provide a different record thereof.

It is a further object of the invention to provide a new and improved information reproducing system for quickly and accurately removing information from an order form and translating that information to a suitable utilizing means.

It is also an object of the invention to provide a new and improved information reproducing system for concurrently removing quantity and item information from the front and rear of an order form and translating it to a utilizing means which provides another record of that information.

It is an additional object of the invention to provide a new and improved information reproducing system which concurrently removes quantity and item information from the front and rear of a series of order forms, the information on each form being representative of a single order, and translates that information to a pair of concurrently operating card punches, each of which reproduces a complete order in a deck of cards.

It is yet another object of the present invention to provide a new and improved method of removing quantity and item information from a record and providing a new record thereof.

In accordance with a particular form of the invention, an information reproducing system comprises means for moving a record which includes a plurality of order forms joined in end-to-end relation, each containing on the front and rear thereof indicia conjointly representative of a single order and indicia representative of the end of the front of that form and the rear thereof. The system also includes first means for scanning the indicia on the front of the moving forms and deriving therefrom a first series of effects representative of a first portion of that order and a first effect representative of the end of the front of a form. The information reproducing system further includes second means for concurrently scanning, one order form displaced from the aforesaid first scanning means, the indicia on the rear of the moving forms and deriving a second series of effects representative of the remainder of that order and a second effect representative of the end of the rear of the displaced form. The information reproducing system additionally includes first and second means for utilizing the aforesaid series of effects to reproduce the orders, and means, for translating the first series of effects to the first utilizing means and the second series of effects to the second utilizing means, responsive to the first and second effects for recurrently shifting the translation of the first series of effects to the second utilizing means and the second series of effects to the first utilizing means, whereby each utilizing means reproduces a complete order.

The foregoing and other objects, features and advantages of the invention will be apparent from the following more particular description of a preferred embodiment of the invention, as illustrated in the accompanying drawings.

Figure 1:
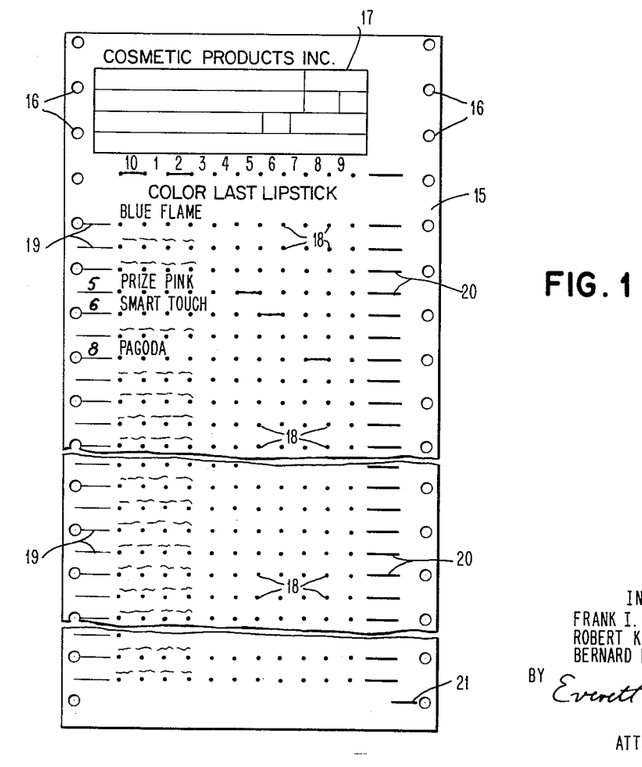
FIGURE 1 represents a portion of a record or order form suitable for use in the information reproducing system of the present invention.
Figure 2:
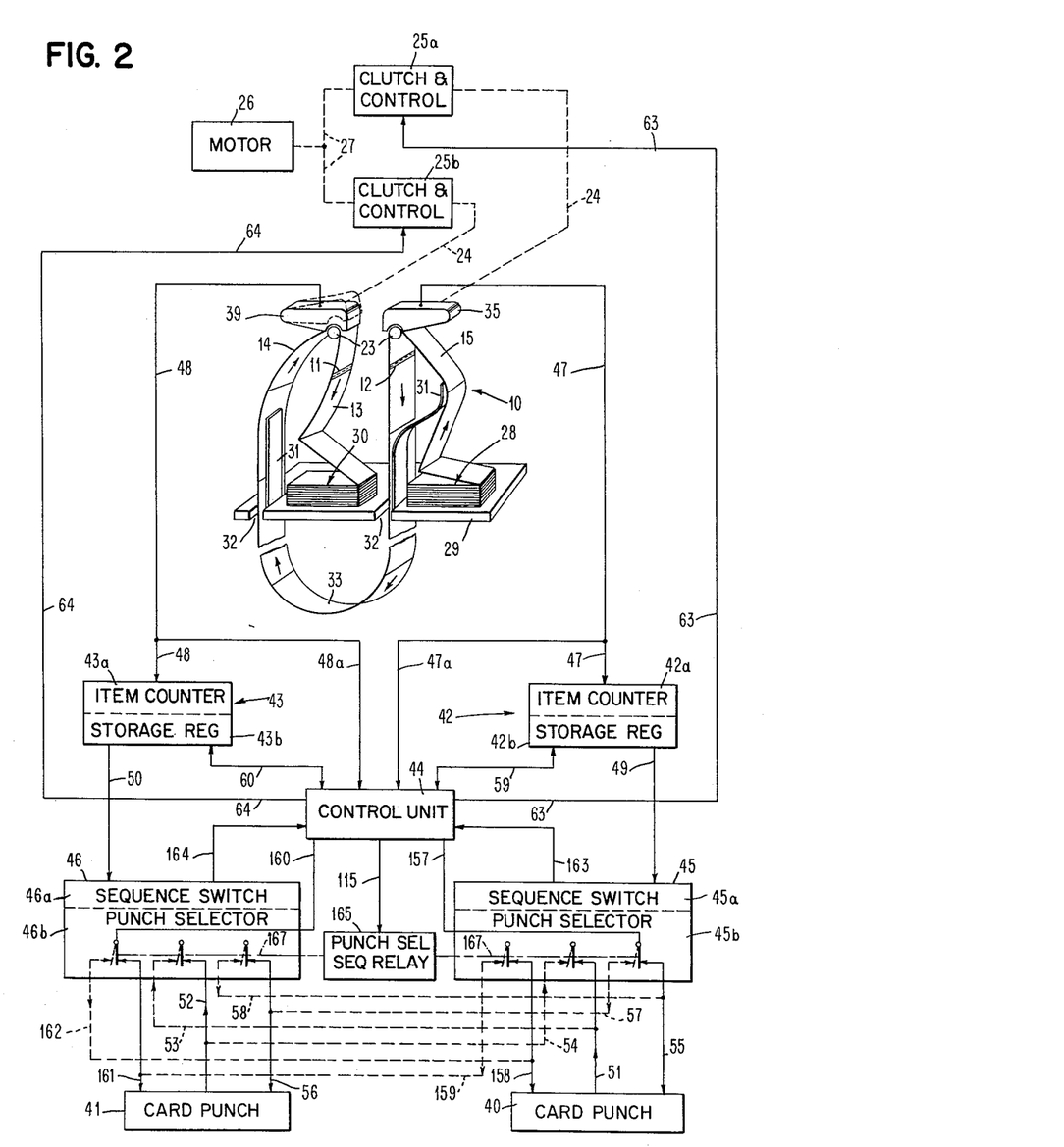
FIGURE 2 is a diagrammatic representation of an information reproducing system in accordance with a particular form of the present invention.

*Description of Order Forms of FIGURES 1 and 2*

Referring now more particularly to FIGURES 1 and 2 of the drawings, the record 10 represented in FIGURE 2 comprises a plurality of fanfold order forms joined in end-to-end relation. Suitable means such as strips of self-sealing tape may be employed to interconnect the adjoining ends of individual order forms. In FIGURE 2, strips 11 and 12 are represented as joining contiguous forms 13, 14 and 15 in end-to-end relationship. It will be realized, however, that the record 10 ordinarily contains a long series of such forms.

Each form may be about seven feet long and contains on the front and rear thereof indicia conjointly representative of a single order and indicia representative of the end of the front of the form and the rear thereof, as will be explained presently. Reference is now made to FIGURE 1 where there is represented a portion of the front of a typical order form 15. Along two sides of the form appears a plurality of feed holes 16, 16 for engagement with sprocket wheels which merely serve to move the forms, as will be explained later. Between the feed holes 16, 16 appears a plurality of horizontal lines of suitable printed legends which may indicate the company, the salesman, his address, and other such information within a rectangle 17. Below the rectangle appears a series of horizontal printed lines that comprise a long list of items carried by the warehouse. Only a few of these items have been represented by readable print to simplify the illustration. It will be noted that just below these printed items there appears a plurality of evenly spaced dots 18, 18 which form a plurality of horizontal rows. To the left of each row and in parallel relation therewith is a dash mark 19, above which the sales representative writes the number of the items which he is ordering from the warehouse. For example, it will be noted that 5 Prize Pink Color Last Lipstick have been ordered along with two other types of lipstick. To the right of each row of dots and also in parallel relationship therewith is a printed dash mark 20 which appears in somewhat heavier print. These dash marks together constitute a vertical series of item marks, there being an item mark for each item on the order form.

Just under the rectangle appears a horizontal row of dots, with an item mark to the left of that row. It will also be noted that no dash mark appears to the left of the row under consideration, and this indicates that no representation of quantity is to be inserted there by the sales representative. Above the row of dots presently under consideration is a plurality of numbers, namely 10 and 1 to 9, inclusive. These numbers need not necessarily be printed on the form but are represented in the drawing for convenience of explanation and understanding. It will be noted that a line has been inserted between the dots under the 10 and another between the dots under the 2. These lines are electrically conductive lines drawn with a suitable pencil between the indicated dots by a clerk at the warehouse, and are employed to designate in machine-readable code an identification number of the sales representative. It will be observed that the identifying number such as that for the sales representative, is 12 and it appears in parallel relation with the first item mark on the right hand side of the form. Thus item 1 is the identification number of the sales representative. Similarly the warehouse clerk has placed a conductive pencil mark between the proper dots to indicate in machine-readable language that 5 Prize Pink, 6 Smart Touch, and 8 Pagoda lipsticks have been ordered. In this manner, prior to joining a plurality of order forms in end-to-tend relation, the warehouse clerk has marked the forms to indicate in machine-readable code the quantity of various items which have been ordered.

In the lower right hand corner of the FIGURE 1 form there appears a printed dash mark 21 which is below and offset to the right of the series of dash marks 20, 20, hereinafter referred to as item marks. The mark 21 is an indicium representative of the end of the front of the form 15 and hereinafter will be referred to as an end of form mark and serves a purpose to be explained subsequently.

The arrangement of the rear of an order form is essentially the same as the front thereof. It differs therefrom in that it does not contain a row for indicating in machine language the identification number of the sales representative and in that the printing and the other indicia are in reverse; that is if one were examining the front of the form and then turned it over about its longitudinal access, the printed words would appear upside down and below the rows of dots, the item marks would appear along the left hand margin, and the end of form mark would be at the lower left hand corner of the form. The reason for this will be explained subsequently.

*Description of Information Reproducing System of FIGURE 2*

Referring now to the diagrammatic representation of the information reproducing system in FIGURE 2, the means for moving the record 10 comprises two pairs of conventional sprocket wheels 23, 23 only the front two of which are visible in the drawing, individual pairs of the wheels being mechanically coupled by suitable means represented by the broken lines 24, 24 to electrically operated clutches 25a and 25b. The clutches in turn are connected to a motor 26 by suitable driving connections 27, 27. The fanfold series of joined order forms comprise a supply pile 28 which rests on one portion of a platform 29 and a receiving pile 30 which rests on another portion thereof. Suitable guiding elements 31, 31 are employed for directing the forms, and the platform 29 has a pair of slots 32, 32 so that a bight 33 which appears in the forms extends below the platform.

The information reproducing system includes first means for scanning the indicia on the front of the moving order forms and for deriving therefrom a first series of effects representative of a first portion of that order and a second effect representative of the end of the front of a form. This first means includes a read head 35 which is disposed in operative relation to the front of the various forms such as the form 15. The read head 35 includes an end of form scanner 36 (see FIGURE 3) and an item mark scanner 37 which are conventional and of identical construction. To that end they may be photoreflective optical systems of the type disclosed in Patent 2,007,391 to Bryce, granted July 9, 1935, and entitled "Record Controlled Punch." Such a system includes a light source, suitable lenses, and a light responsive device such as a photocell which responds to a change in the light reflected from the order form in the immediate vicinity of the item mark or an end of form mark, as the case may be, and thereby produces an electrical output signal. The scanning means of the read head 35 also includes a quantity mark scanning system 38 for scanning the various quantity marks which may be pencilled in on the form to designate quantities of items ordered. This scanning system is preferably an array of conventional conductive mark-scanning brushes which individually are effective to establish an electrical circuit when in engagement with a pencilled-in conductive mark on the form. Such systems are well known in the art and may be of the type represented in Patent 2,690,220 to Wilson, granted September 28, 1954, entitled "Mark Sensing Reproducer" and assigned to the same assignee as the present invention. Since the form represented in FIGURE 1 is able to accommodate conductive pencil marks in 11 positions or columns, the quantity mark scanning system 38 includes 11 scanners. It will be understood, however, that where a larger quantity than 19 is to be designated on the order form, additional columns may be required on the form and various well-known code combinations may be employed to designate such larger numbers. The end of form and the item mark scanners together with the quantity mark scanners are geometrically arranged in the head 35 so as to orient properly with the several types of marks on the front of the order form 15 which is represented as passing by the head.

The information reproducing system further includes a second means, in the form of a second read head 39 for concurrently scanning one order form displaced from the first scanning means or head 35, the indicia on the rear of moving forms and for deriving therefrom a second series of effects repesentative of the remainder of the order on, for example the form 15, and for deriving a second effect representative of the end of the rear of the form 15. The read head 39 includes components which are identical with those on the head 35 and which are arranged to read or scan the information on the back of a form 14 and the back of the succeeding form 15 when it arrives under the head 39. The broken-line representation of the head 39 indicates that it is suitably pivoted to permit the insertion of a form on the sprocket wheels 23, 23 under the head. Read head 35 has a similar feature.

The information reproducing system further includes first and second means for utilizing the series of effects developed by the quantity and item mark scanners of the read heads 35 and 39 to reproduce the orders appearing in the series of order forms. While various types of apparatus may be employed for reproducing those orders, card punches 40 and 41 (see FIGURE 2) for perforating the well-known 80 vertical column 3¼" x 7⅜" cards have proved to be particularly useful for that purpose. Such card punches are well known in the art and may be of the type disclosed in Patent 2,647,581 Gardinor et al., granted August 4, 1953, entitled "Record Card Punch Machine," and assigned to the same assignee as the present invention.

The information reproducing system additionally includes means for translating the first series of effects to the first utilizing means or card punch 40 and the second series of effects to the second utilizing means or card punch 41, the translating means being responsive to the first and second effects developed by the end of form scanners 36, 36 for recurrently shifting the translation of the first series of effects to the second card punch 41 and the second series of effects to the first card punch 40, whereby each of the card punches reproduces a complete order. This translating means includes a pair of item counters 42a and 43a and storage registers 42b and 43b in units 42 and 43, respectively, and further includes a control unit 44, and a pair of units 45 and 46 which comprise sequence switches 45a and 46a and punch selectors 45b and 46b. The output signals or effects developed by the read head 35 are applied to units 42 and 44 through conductor cables 47 and 47a while the output signals from read head 39 are similarly applied to units 43 and 44 through cables 48 and 48a. The item counter 42a may be a conventional unit such as a rotary stepping switch that is capable of providing a maximum item count, such as 999, corresponding to the total number of item marks on one side of a form. In one type of item counter, three decade counters, one comprising a units counter, another a tens counter, and the third a hundreds counter, which are resettable to zero, may be employed. The signal outputs of the item counters 42a and 43a are applied to the input circuits of the storage registers 42b and 43b, which are also of conventional construction and may comprise, for example, a system of storage relays of the type disclosed in Patent 2,731,196 Luhn, granted January 17, 1956, entitled "Self-Checking Number Punch" and assigned to the same assignee as the present invention.

The output of the storage registers 42b and 43b are connected through conductor cables 49 and 50 to the sequence switches 45a and 46a of units 45 and 46. The sequence switches 45a and 46a each comprise a conventional stepping switch which has a suitable number of banks of contacts and which, under the control of a card punch, is capable of stepping through each of the digital positions of a storage register so as sequentially to read out the information in the register. Control cables 51 and 52, represented in solid-line construction, together with similar cables 53 and 54, shown in broken line construction, supply cyclic control or timing signals from the punch circuits of the card punches 40 and 41 to control the sequential stepping of the stepping switches of units 45 and 46 for the purpose of reading out the information stored in registers 42b and 43b. The output signals representative of quantity and item information from the sequence switches are fed to the punch control windings of the card punches 40 and 41 through the punch selectors 45b and 46b and conductor cables 55 and 56, shown in solid lines, and through similar cables 57 and 58 which are represented by broken lines. The control unit 44 is connected through a cable 157 to the punch selector 45b, and the latter is connected to clutch-control windings in the card punches 40 and 41 through cables 158 and 159, respectively. Similarly, the control unit 44 is connected through a cable 160 to the punch selector 46b, and the latter is connected to clutch control windings in the card punches 41 and 40 through cables 161 and 162, respectively. The punch selectors 45b and 46b may be switching elements such as the contacts of a conventional relay identified as the punch selector sequence relay 165. This relay, when actuated by a control signal applied thereto by control unit 44 via a cable 115, operates those contacts by a unicontrol means 167, represented by the dash-dot lines, and recurrently shifts them from their solid line positions to those represented by the broken lines, and vice versa. This in turn modifies the paths in which information is translated through the punch selectors 45b and 46b.

The control unit 44 is also connected to each of units 42 and 43 through control cables 59 and 60, respectively, and is also connected to the electrically operated clutches 25a and 25b through control conductors 63 and 64, respectively. The various portions of the control unit 44 will be described in greater detail.

*Explanation of Operation of Information System of FIGURE 2*

At this time a brief explanation of the operation of the information reproducing system in connection with the functional block diagram of FIGURE 2 will be helpful. It will be assumed at the outset that the motor 26 is running and that the clutches 25a and 25b are engaged so as to feed the series of fanfold forms past the read heads 35 and 39, that the switching elements of the punch selectors 45b and 46b are in the positions represented by the solid lines, and that the card punches 40 and 41 are in their operative condition and are thus conditioned to accept signals representative of item and quantity information applied thereto from the punch selectors 45b and 46b through the cables 55 and 56. It will also be assumed that the head 35 has just begun to read the indicia on the front of the form 15 while the head 39 has commenced to read the information on the rear of form 14. Head 35 senses the item marks on form 15 and any quantity marks in parallel relation thereto and develops two series of electrical pulses for application through the cable 47 to unit 42. Each pulse representative of an item mark actuates the item counter 42a. Item pulses and those corresponding pulses representative of quantity are fed into the storage register 42b. When the register is momentarily full and the card punch 40 indicates to the sequence switch 45a by way of a control signal applied to the selector 45b via conductor cable 51 that it is in condition to accept information from the register 42b, the sequence switch 45a proceeds to step through the several digital positions of the storage register 42b, under the control of timing signals supplied from the card punch via cable 51, and serially translates the information at those positions via cable 55 to the punch windings of the card punch. The latter punches into 80 column cards item and the quantity information that has been read from the front of the form 15. As the head 35 continues to read item and quantity information, the described operation continues.

In a similar manner, the units 43 and 46 presently associated with the read head 39 and the card punch 41 translate signals representative of item and quantity information appearing on the back of form 14 into the card punch 41, and the latter reproduces the information in a card or cards. Since the form feeding means associated with each read head is independently clutched, it is not essential that the two adjoining forms remain in step in order that their end of form marks arrive under the read heads simultaneously. Let a situation now be assumed in which the read head 35 has finished its scanning of the quantity and item information on the front of form 15 before the head 39 has completed the scanning of the corresponding information on the back of form 14. Accordingly, when head 35 scans the end of form mark 21 (FIGURE 1) on the front of form 15, it develops a signal for application via cable 47a to the control unit 44. The latter in turn develops a control signal for application by way of the conductor 63 to the clutch control 25a for disengaging the clutch so as to discontinue the feeding of the form 15. At the same time the control unit 44 applies a control signal by way of the cable 59 to the item counter 42 to reset it to zero. It will be understood that the loop 33 in the series of joined order forms is sufficiently large to permit the feeding of form 14 until the end of form mark on the back of that form is scanned by the read head 39 to develop a control signal for application via cable 48a to control unit 44. The latter then applies a control signal by way of conductor 64 to the other clutch 25b, thus interrupting the feeding of form 14. A control signal is also applied by the cable 60 to the item counter 43a to reset it to zero. The appearance of the control signals in the control unit 44 resulting from the scanning of both of the end of the form marks develops a further control signal which is applied by conductor 115 to the punch selector sequence relay 165. This shifts the switching means of the punch selectors 45b and 46b from their solid-line positions to those represented by the broken lines, and thereby rearranges the various circuits through the punch selectors. Signals representative of item and quantity information soon to read out of the storage register 43b by sequence switch 46a may be translated by cable 58 to card punch 40; timing signals from card punch 40 are translated by cable 53 and the punch selector 46b to the sequence switch 46a to control the operation of the latter in reading out the information in register 43b; and signals for stopping card punch 40 are applied thereto by control unit 44 via cable 160, punch selector 46b, and conductor 162. Similarly signals representing quantity and item information soon to be read out of the other storage register 42b by the sequence switch 45a may be translated by cable 57 to card punch 41; timing signals from card punch 41 are translated by cable 54 and punch selector 45b to the sequence switch 45a to control the operation of the latter in reading out the information in register 42b; and signals for stopping the card punch 41 are applied thereto by control unit 44 via cable 157, punch selector 45b, and cable 159.

The control signals applied from control unit 44 by the conductors 63 and 64 to the clutches 25a and 25b now terminate, the clutches engage, and the operation of the information reproducing system resumes. Head 35 presently reads the information on the front of the next form drawn from the supply pile 28, and that information is translated into the card punch 41 via cable 47, unit 42, cable 49, unit 45 and cable 57. Similarly, head 39 now reads the information on the back of form 15 and translates it by way of cable 48, unit 43, cable 50, unit 46 and cable 58 to card punch 40. From the above explanation, it will be clear that since circuits have been established whereby card punch 40 receives the item and quantity information from both the front and the back of the form 15, it will punch out a card or deck of cards containing the complete order contained in order form 15. When the end of form marks on the front and rear of the forms presently being read are sensed by the read heads 35 and 39, the punch selectors 45b and 46b are next actuated to translate information back into the respective card punches 40 and 41. The described alternate switching of information from read heads to card punches continues as successive forms are read so that the proper correlation of individual orders within individual decks of cards produced by the card punches takes place.

Figure 4:
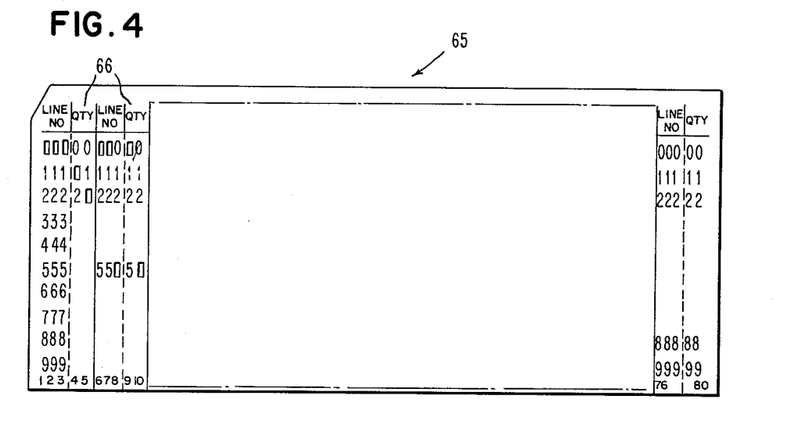
FIGURE 4 represents a card in which has been punched information that appears on a portion of the moving record of FIGURE 1.

In FIGURE 4 there is represented diagrammatically a particular embodiment of a card 65 which has been punched by one of the card punches with information read out of one of the heads, such as the head 35. This 80 column card contains 16 fields 66, 66 each of which contains three columns that may be punched with item information (designated Line No.) and two columns (designated Qty.) which may be punched to receive quantity information. The card also contains ten rows which are numbered from 0 to 9. The first or left hand field of each group of cards for a single order is punched to indicate the sales representative's number, and the succeeding fields are punched to designate item and quantity information. An order is always started with the punching of a new card. It will be seen that the five digits are punched into each field of the card for each item ordered, the item or line number being punched first followed by the quantity number. The selector switches 45a and 46a of FIGURE 2 establish this punching sequence.

Figure 3:
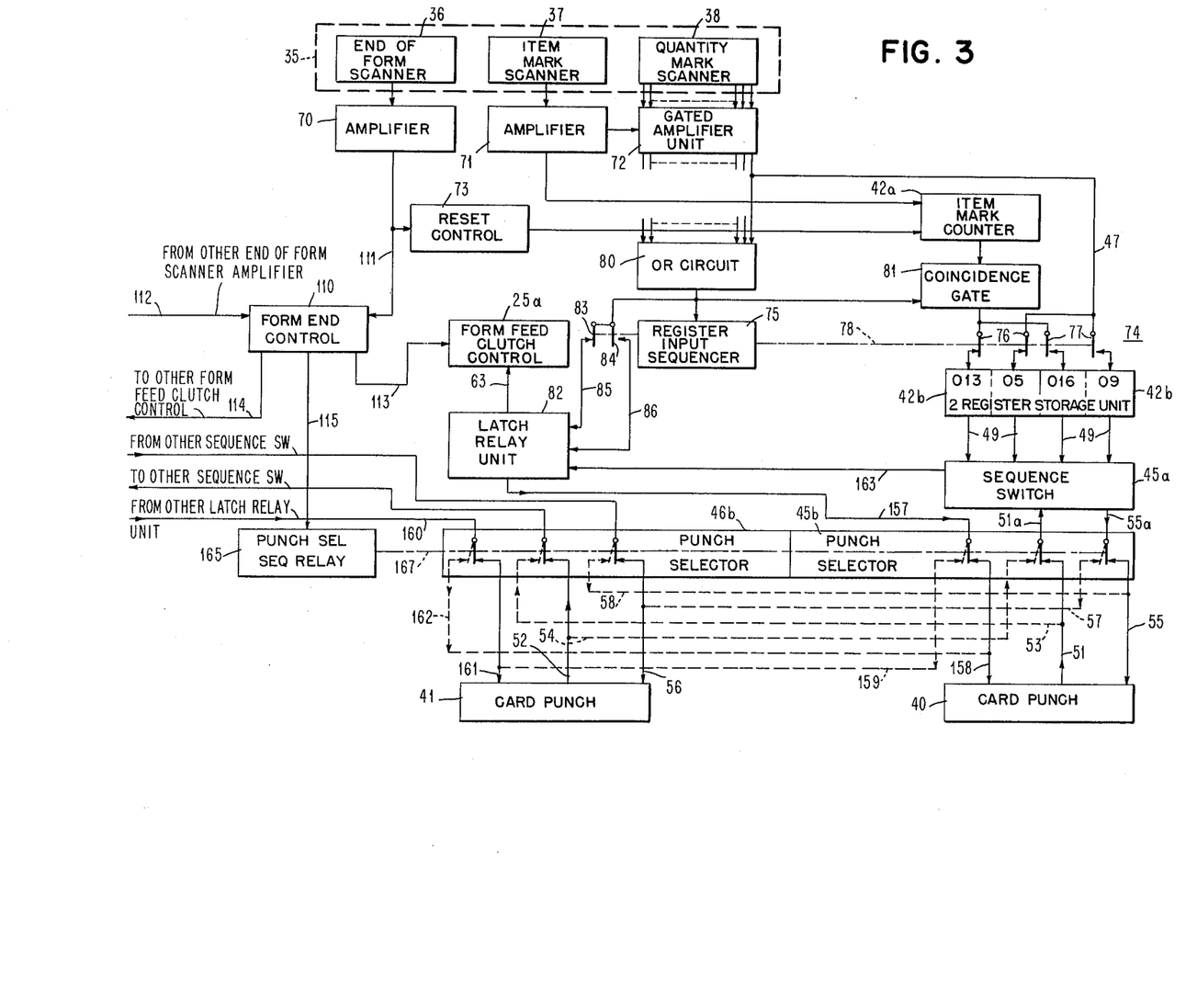
FIGURE 3 is a block diagram representing in greater detail one half of the system shown in FIGURE 2.

Description of FIGURE 3 Portion of System

As previously stated, FIGURE 3 represents in somewhat greater detail a portion of the information reproducing system of FIGURE 2 such as that associated with the read head 35. The system also includes a corresponding portion associated with the read head 39, most of which has not been represented simply to avoid unnecessary duplication. The end of form and item mark scanners 36 and 37 are connected to conventional amplifiers 70 and 71, respectively, while individual scanners of the quantity mark scanner 38 are coupled to individual gated amplifiers of the gated amplifier unit 72. These gated amplifiers are of conventional construction and each may include an electron tube having a pair of input electrodes, one of which is connected to a quantity mark scanner and the other of which is connected to an output electrode of the amplifier 71 associated with the item mark scanner so that coincident application of a signal to the two input electrodes of a gated amplifier renders it conductive to develop an output signal. The signal output of amplifier 71 is connected to the counting input circuit of the item mark counter 42a which was previously described in connection with FIGURE 2. The resetting element of the counter 42a is connected to the amplifier 70 for the end of form scanner 36 through a reset control 73 which may comprise a relay.

The signal outputs of the gated amplifiers of unit 72 are connected through the cable 47 and a control or switching means 74 to the signal inputs of unit 42b, which was previously described in connection with FIGURE 2 as being a storage register. Since the read heads of the system are ordinarily capable of reading information on the order forms and translating it to a storage register faster than it can be translated from the latter and punched into cards by the card punches, unit 42b preferably comprises a plurality of storage registers such as the two which are represented in FIGURE 3 as comprising the storage unit. Each half of the register is identical with the other and is capable of storing, for example, three digits of item information and two digits of quantity information, as is represented diagrammatically. However, only the quantity section of one register at a time is connected to the gated amplifiers of unit 72, and this is determined by the position of the switching means 74 under the control of a register input sequencer 75. The sequencer may comprise a conventional stepping relay which controls another relay, the movable contacts of the latter being so arranged that one group, such as the represented pair 76, 76 are closed while the other group, such as the represented pair 77, 77, are open, and vice versa. The contacts are arranged for unicontrol operation by the relay or relays of the sequencer 75, as shown by the dash-dot line 78. The various outputs of the gated amplifiers of unit 72 are also connected to an OR circuit 80, the common output circuit which is connected to the register input sequencer 75 and to an input circuit of a coincidence gate 81 of conventional construction. The other input circuit of the coincidence gate 81 is connected to the output circuit of the item counter 42a, while its output circuit is connected through the switching means 74 to the item input circuits of the registers of storage unit 42b in the manner represented.

Figure 5:
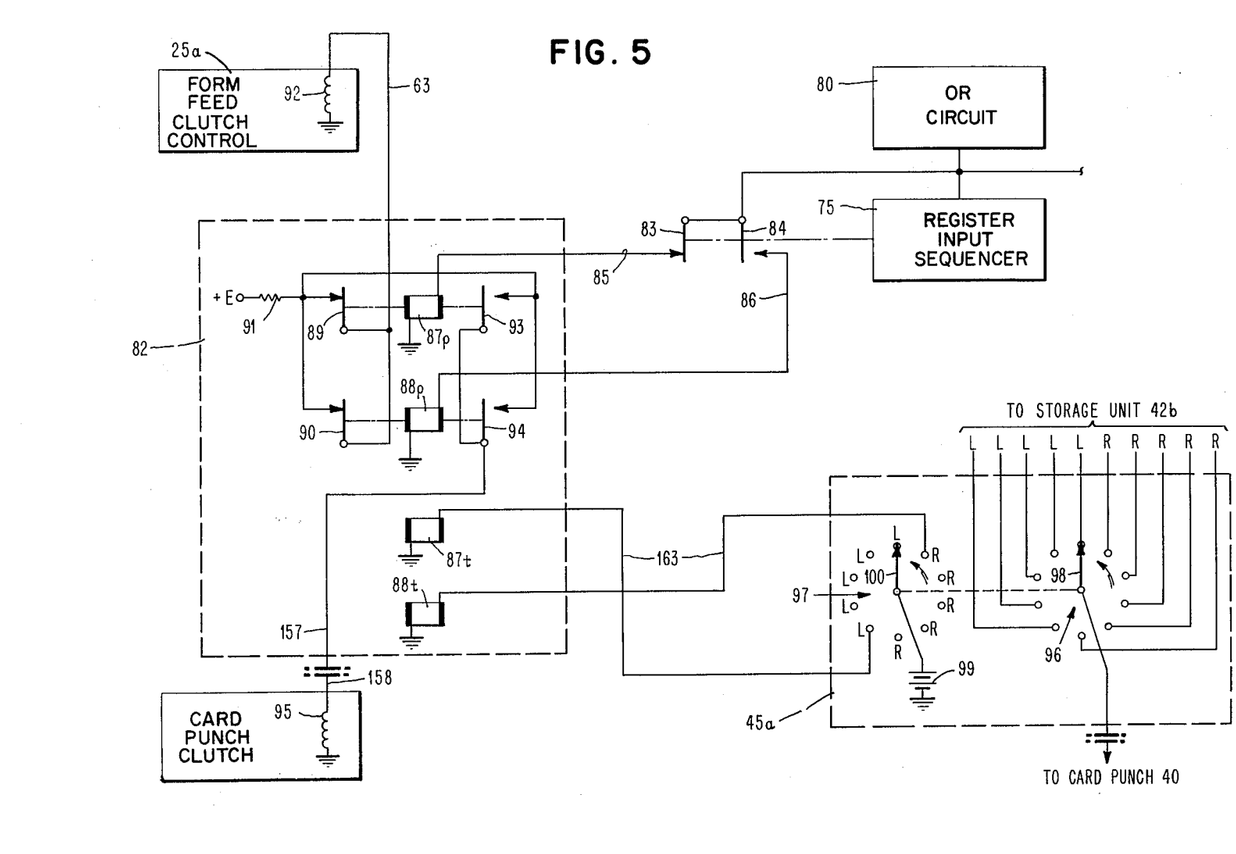
FIGURE 5 is a circuit diagram of a portion of the system of FIGURE 3.

A latch relay unit 82 is connected by a cable 63 to the form feed clutch control 25a for the purpose disengaging the clutch when both registers are full. The OR circuit 80 is adapted to be connected to two pick or latch circuit in unit 82, one circuit for each storage register, through a pair of switches 83 and 84 and conductors 85 and 86. The switches are arranged for unicontrol operation by the register input selector 75, one of the switches being open when the other is closed, and vice versa. FIGURE 5 represents a circuit which may be employed as the latch relay unit 82. The unit includes a pair of pick windings 87p and 88p having grounded first terminals and having second terminals connected to the conductors 85 and 86 as indicated. A pair of parallel-connected normally closed contacts 89 and 90 associated with the windings 87p and 88p are connected in a circuit which includes a source +E, a resistor 91, the contacts, and a winding 92 which is in the form feed clutch control 25a. When winding 92 is energized, the form feed clutch control is operative to engage its clutch, thus causing a form such as form 15 to be fed. A pair of parallel-connected normally open contacts 93 and 94 are also associated with the pick windings 87p and 88p, respectively, and are connected in another series circuit with the source +E, the resistor 91, and a clutch-control winding 95 which is in the card punch 40 and, when energized, maintains the card punch in an operative state.

The sequence switch 45a is represented in FIGURE 5 as including two banks 96 and 97, each containing a wiper and ten switch points. For simplification purposes, the stepping winding has been omitted in the representation. Ten switch points are employed since the two registers of the storage unit 42b contain a total of ten digital positions which are to be read out sequentially by rotation of the wiper 98. Five switch points for bank 97 are identified with the letter L to designate that they are associated with the left hand register of the storage unit 42b of FIGURE 2 while the remaining five are identified with the letter R to indicate that they are associated with its right hand register. The last contact to be wiped in the right hand group of bank 97 is connected to a trip winding 88t for selectively tripping or unlatching the contacts 90 and 94. Similarly the last contact of the left hand group of bank 97 is connected to the trip winding 87t for selectively tripping the contacts 89 and 93. A battery 99 is represented as being connected to the wiper 100 of bank 97 for energizing the windings 87t and 88t.

Referring again to FIGURE 3, a form end control 110, which in a simple embodiment may comprise a suitable coincidence or AND circuit having a pair of input circuits, each of which may contain a suitable relay holding circuit, has those input circuits connected to the end of form scanner amplifiers by connections 111 and 112. Output circuits of the form end control 110 are connected to the form feed control clutches by connections 113 and 114, and to the punch selector sequence relay 165 by connection 115.

*Explanation of Operation of FIGURE 3 System*

Since the overall operation of the information reproducing system has been explained in connection with FIGURE 2, only the operation of various portions of the FIGURE 3 arrangement will now be considered. The item mark counter 42a responds to each pulse applied thereto by the amplifier 71 from the item mark scanner 37. The OR circuit 80 responds to each pulse applied thereto from the gated amplifier unit 72 and, in turn, applies an output pulse to the coincidence gate 81 simultaneous with the application thereto of a corresponding item signal from the item mark counter 42a. Each output pulse from the OR circuit 80 actuates the register input sequencer 75 and, in turn, operates the switching means 74 after each entry has been made into a register and in such a manner that only one register at a time of a storage unit 42b is connected simultaneously to receive both the item information from the coincidence gate 81 and the quantity information from the gated amplifier unit 72.

The card punch 40 supplies control signals via cables 51 and 51a to the sequence switch 45a, thereby causing data to be read out digit by digit from the various positions of a register containing information. Upon completion of the reading out of any register, the sequence switch 45a is in position to start the reading from the next register as soon as information has been entered into that register. This information is directed by the punch selector 45b via cable 55 into the punch 40, which punches that information into a card or cards in a step by step fashion in the manner well known in the art. The described sequential operation of the portion of the system presently associated with card punch 40 continues as additional item and quantity information is read from the front of order form 15. It will be understood that the units associated with the read head 39 and corresponding to those represented in FIGURE 3 operate in a manner similar to that explained above and translate the information from the back of form 14 into the punched cards produced by the punch 41.

The operation of that portion of the system which includes the card punch 40 will now be considered with relation to the latch unit of FIGURE 5. It will be assumed that the relay contacts 89, 90, 93, and 94 are unlatched and hence in the positions represented in FIGURE 5. For this condition, a circuit is completed from the source +E through resistor 91, the parallel connected relay contacts 89 and 90, and conductor 63 to the winding 92 in the form feed clutch control 25a. This energizes the winding 92 and causes the clutch to engage, and a form such as the form 15 advances under the read head 35. Since the contacts 93 and 94 are open, the circuit to the winding 95 of the card punch clutch is open and the card punch clutch is therefore disengaged.

The application of a signal to the OR circuit as the result of the scanning of an item mark and a corresponding quantity mark on the form 15 translates that information into the left hand storage register 42b shown in FIGURE 3. Simultaneously switch 83 now causes the pick winding 87p to be energized and it closes the contact 93 and completes the series circuit between the source +E and the winding 95. Shortly after the entry of information into the left hand register, the register input sequencer 75 because of its inherent delaying action, moves to the right and disengages the switch 83 while engaging the switch 84. The position of switching means 74 is similarly shifted so that the input circuit to the left hand register is opened while that to the right hand register is completed in preparation for the next item when it appears. The energization of winding 95 is effective to engage the clutch of the card punch 40 so that the latter is now in an operative condition to receive information from the left hand register of unit 42b. Card punch 40 then transmits timing signals to the sequence switch 45a via cable 51, punch selector 45b, and cable 51a and causes the sequence switch to step around to the last of the left hand switch points L of the bank 97. While this is being done, the card punch 40 punches out into a card the information appearing in the left hand register of unit 42b. When the wiper 100 arrives at the switch point just mentioned it completes a circuit through conductor 163 and energizes the trip winding 87t for the contacts 89 and 93. Contact 93 opens and, since contact 94 previously was open, the circuit to winding 95 is interrupted and the card punch clutch is disengaged. Since contact 90 was closed during these operations, the feeding of form 15 continues.

The next bit of quantity and item information is directed to the right hand register of unit 42b, and the related signal applied through the OR circuit 80 and switch 84 energizes pick winding 88p. Upon completion of the entry, register input sequencer 75 will shift, in the manner previously described, the switching means 74 and switches 83 and 84 to the position shown in FIGURES 3 and 5 in preparation for receiving the next entry. The described energization of winding 88p closes relay contact 94 which, in turn, completes a circuit for the winding 95 of the card punch clutch and places the card punch 40 in a condition to develope a series of timing signals for application to the sequence switch 45a. Contact 90 is now open but since contact 89 is closed, the winding 92 remains energized and the feeding of forms continues. The wiper 98 now sequentially engages the contacts associated with the right hand register of the storage unit and proceeds to read out the information therein and translates it into the card punch in the manner previously explained.

Assuming that another bit of item and quantity information is received before the previous information has been read out of the right hand register, the new information is directed into the empty left hand register. At the same time winding 87p will be energized. Contact 93 then closes but this does not affect the energization of winding 95 and the operation of the punch 40 since contact 94 previously was closed. Contact 89 now opens and since contact 90 previously was open, winding 92 is de-energized and the feeding of the form is interrupted, signifying that both registers are full and hence unable to accept new information until that in the right hand register had been read out. When the wiper 100 engages the last of the right hand contacts of bank 97, trip winding 88t is energized and the contacts 90 and 94 return to the position indicated in FIGURE 5. The closing of contact 90 energizes the winding 92, and the feeding of the form continues. However, since contact 93 is closed, the punch continues in operation and now punches out the information in the left hand register.

In a similar manner, the units of FIGURES 3 and 5 associated with the punch 40 continue the type of operation just explained and the punch 40 reproduces the information appearing on a form such as form 15. Similarly, the corresponding units associated with the other punch 41 cause the latter to reproduce the information appearing on the back of form 14.

From the foregoing description and explanation, it will be clear that an information reproducing system in accordance with the invention features speed and accuracy in the concurrent removal of quantity and item information from the front and rear of a series of order forms, the information on each form representing a single order, and translating that information to a pair of concurrently operating card punches, each of which reproduces a complete order in a card or group of punched cards. Speed of operation is accomplished by the reading of both sides of a form in one pass through the system. By retaining the forms in their original fanfold layout, the inertia problems of the form feeding equipment are minimized since only one relatively short length of paper is moved at any one time.

It will also be manifest that the series of item marks on the order forms not only constitute a representation of the various items in the order but also constitute a reliable means for programming the operation of the system. Programming by only the item marks effectively suppresses any counting of lines on a form containing only advertising matter, group headings, or other non-machine language.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. An information reproducing system comprising: means for moving a record which includes a plurality of order forms joined in end-to-end relation, each containing on the front and rear therof indicia conjointly representative of a single order and indicia representative of the end of the front of that form and the rear thereof; first means for scanning the indicia on the front of the moving forms and deriving therefrom a first series of effects representative of a first portion of that order and a first effect representative of the end of the front of a form; second means for concurrently scanning, one order form displaced from said first scanning means, the indicia on the rear of the moving forms and deriving therefrom a second series of effects representative of the remainder of that order and a second effect representative of the end of the rear of the form; first and second means for utilizing said series of effects to reproduce said orders; and means, for translating said first series of effects to said first utilizing means and said second series of effects to said second utilizing means, responsive to said first and second effects for recurrently shifting the translation of said first series of effects to said second utilizing means and said second series of effects to said first utilizing means, whereby each utilizing means reproduces a complete order.

2. An information reproducing system comprising: a record which includes a plurality of order forms joined in end-to-end relation, each containing on the front and rear thereof indicia conjointly representative of a single order and indicia representative of the end of the front of that form and the rear thereof; means for moving said record; first means for scanning said indicia on the front of the moving forms and deriving therefrom a first series of effects representative of a first portion of that order and a first effect representative of the end of the front of a form; a second means for concurrently scanning, one order form displaced from said first scanning means, said indicia on the rear of the moving forms and deriving therefrom a second series of effects representative of the remainder of that order and a second effect representative of the end of the rear of the form; first and second means for utilizing said series of effects to reproduce said orders; and means, for translating said first series of effects to said first utilizing means and said second series of effects to said second utilizing means, responsive to said first and second effects for recurrently shifting the translation of said first series of effects to said second utilizing means and said second series of effects to said first utilizing means, whereby each utilizing means reproduces a complete order.

3. An information reproducing system comprising: a record which includes a plurality of order forms joined in end-to-end relation, each containing on the front and rear thereof indicia conjointly representative of quantity and item information for a single order and indicia representative of the end of the front of that form and the rear thereof; means for moving said record; first means for scanning the indicia on the front of the moving forms and deriving therefrom a first series of effects representative of a first portion of that order and a first effect representative of the end of the front of a form; second means for concurrently scanning, one order form displaced from said first scanning means, the indicia on the rear of the moving forms and deriving therefrom a second series of effects representative of the remainder of that order and a second effect representative of the end of the rear of the form; first and second means for utilizing said series of effects to reproduce said orders; and means, for translating said first series of effects to said first utilizing means and said second series of effects to said second utilizing means, responsive to said first and second effects for recurrently shifting the translation of said first series of effects to said second utilizing means and said second series of effects to said first utilizing means, whereby each utilizing means reproduces a complete order.

4. An information reproducing system comprising: a record which includes a plurality of order forms joined in end-to-end relation, each containing on the front and rear thereof first indicia conjointly representative of a single order and second indicia representative of the end of the front of that form and the rear thereof, said first indicia being a printed series of item marks and a plurality of quantity marks which were inserted in a predetermined relation to at least some of said item marks in accordance with a predetermined code to represent the quantities of items ordered; means for moving said record; first means for scanning said indicia on the front of the moving forms and deriving therefrom a first series of effects representative of a first portion of that order and a first effect representative of the end of the front of a form; second means for concurrently scanning, one order form displaced from said first scanning means, said indicia on the rear of the moving forms and deriving therefrom a second series of effects representative of the remainder of that order and a second effect representative of the end of the rear of the form; first and second means for utilizing said series of effects to reproduce said orders; and means, for translating said first series of effects to said first utilizing means and said second series of effects to said second utilizing means, responsive to said first and second effects for recurrently shifting the translation of said first series of effects to said second utilizing means and said second series of effects to said first utilizing means, whereby each utilizing means reproduces a complete order.

5. An information reproducing system comprising: means for moving a record which includes a plurality of order forms joined in end-to-end relation, each containing on the front and rear thereof indicia conjointly representative of a single order and indicia representative of the end of the front of that form and the rear thereof; first means for scanning the indicia on the front of the moving forms and deriving therefrom a first series of effects representative of a first portion of that order and a first effect representative of the end of the front of a form; second means for concurrently scanning, one order form displaced from said first scanning means, the indicia on the rear of the moving forms and deriving therefrom a second series of effects representative of the remainder of that order and a second effect representative of the end of the rear of the form; first and second card punches for utilizing said series of effects to reproduce said orders; and means, for translating said first series of effects to said first punch and said second series of effects to said second punch, responsive to said first and second effects for recurrently shifting the translation of said first series of effects to said second punch and said second series of effects to said first punch, whereby each punch reproduces a complete order.

6. An information reproducing system comprising: a record which includes a plurality of order forms joined in end-to-end relation, each containing on the front and rear thereof first indicia conjointly representative of a single order and second indicia representative of the end of the front of that form and the rear thereof, said first indicia being a printed series of item marks and a plurality of quantity marks which were inserted in parallel relation to at least some of said item marks in accordance with a predetermined code to represent the quantities of items ordered; means for moving said record; first means for scanning said indicia on the front of the moving forms and deriving therefrom a first series of effects representative of a first portion of that order and a first effect representative of the end of the front of a form; second means for concurrently scanning, one order form displaced from said first scanning means, said indicia on the rear of the moving forms and deriving therefrom a second series of effects representative of the remainder of that order and a second effect representative of the end of the rear of the form; first and second card punches for utilizing said series of effects to reproduce said orders; and means, for translating said first series of effects to said first punch and said second series of effects to said second punch, responsive to said first and second effects for recurrently shifting the translation of said first series of effects to said second punch means and said second series of effects to said first punch, whereby each punch reproduces a complete order.

7. An information reproducing system comprising: means for moving a record which includes a plurality of order forms joined in end-to-end relation, each containing on the front and rear thereof indicia conjointly representative of a single order and indicia representative of the end of the front of that form and the rear thereof; first means for scanning the indicia on the front of the moving forms and deriving therefrom a first series of effects representative of a first portion of that order and a first effect representative of the end of the front of a form; second means for concurrently scanning, one order form displaced from said first scanning means, the indicia on the rear of the moving forms and deriving therefrom a second series of effects representative of the remainder of that order and a second effect representative of the end of the rear of the form; first and second means for utilizing said series of effects to reproduce said orders; and means, including first and second register storage units, for translating said first series of effects to said first unit and from the latter to said first utilizing means and for translating said second series of effects to said second unit and from the latter to said second utilizing means, said translating means being responsive to said first and second effects for recurrently shifting the translation of said first series of effects from said first unit to said second utilizing means and said second series of effects from said second unit to said first utilizing means, whereby each utilizing means reproduces a complete order.

8. An information reproducing system comprising: a record which includes a plurality of order forms joined in end-to-end relation, each containing on the front and rear thereof first indicia conjointly representative of a single order and second indicia representative of the end of the front of that form and the rear thereof, said first indicia being a printed series of item marks and a plurality of quantity marks which were inserted in a predetermined relation to at least some of said item marks in accordance with a predetermined code to represent the quantities of items ordered; means for moving said record; first means for scanning said indicia on the front of the moving forms and deriving therefrom a first series of effects representative of a first portion of that order and a first effect representative of the end of the front of a form; second means for concurrently scanning, one order form displaced from said first scanning means, the indicia on the rear of the moving forms and deriving therefrom a second series of effects representative of the remainder of that order and a second effect representative of the end of the rear of the form; first and second means for utilizing said series of effects to reproduce said orders; and means, including first and second register storage units, for translating said first series of effects to said unit and from the latter to said first utilizing means and for translating said second series of effects to said second unit and from the latter to said second utilizing means, said translating means being responsive to said first and second effects for recurrently shifting the translation of said first series of effects from said first unit to said second utilizing means and said second series of effects from said second unit to said first utilizing means, whereby each utilizing means reproduces a complete order.

9. An information reproducing system comprising: a record which includes a plurality of order forms joined in end-to-end relation, each containing on the front and rear thereof first indicia conjointly representative of a single order and second indicia representative of the end of the front of that form and the rear thereof, said first indicia being a printed series of item marks and a plurality of quantity marks which were inserted in a predetermined relation to at least some of said item marks in accordance with a predetermined code to present the quantities of items ordered; means for moving said record; first means for optically scanning said item marks and conductively sensing said quantity marks on the front of the moving forms and deriving therefrom a first series of effects representative of a first portion of that order, and for optically scanning said second indicia on the front of a form and deriving therefrom a first effect representative of the end of the front of a form; second means for concurrently and optically scanning, one order form displaced from said first scanning means, said item marks and conductively sensing said quantity marks on the rear of the moving forms and deriving therefrom a second series of effects representative of the remainder of that order, and for optically scanning one order form displaced from said first scanning means, said second indicia on the rear of the displaced form and deriving therefrom a second effect representative of the end of the rear of the form; first and second means for utilizing said series of effects to reproduce said orders; and means, including first and second register storage units, for translating said first series of effects to said unit and from the latter to said first utilizing means and for translating said second series of effects to said second unit and from the latter to said second utilizing means, said translating means being responsive to said first and second effects for recurrently shifting the translation of said first series of effects from said first unit to said second utilizing means and said second series of effects from said second unit to said first utilizing means, whereby each utilizing means reproduces a complete order.

10. An information reproducing system comprising: a record which includes a plurality of order forms joined in end-to-end relation, each containing on the front and rear thereof first indicia conjointly representative of a single order and second indicia representative of the end of the front of that form and the rear thereof, said first indicia being a printed series of item marks and a plurality of quantity marks which were inserted in a predetermined relation to at lease some of said item marks in accordance with a predetermined code to represent the quantities of items ordered; means for moving said record; first means for optically scanning said item marks and for conductively sensing said quantity marks on the front of the moving forms and deriving therefrom a first series of effects representative of a first portion of that order, and for optically scanning said second indicia on the front of a form and deriving therefrom a first effect representative of the end of the front of a form; second means for concurrently and optically scanning, one order form displaced from said first scanning means, said item marks and for conductively sensing said quantity marks on the rear of the moving forms and deriving therefrom a second series of effects representative of the remainder of that order, and for optically scanning, one order form displaced from said first scanning means, said second indicia on the rear of the displaced form and deriving therefrom a second effect representative of the end of the rear of the form; first and second card punches for utilizing said series of effects to reproduce said orders; and means, including first and second register storage units, for translating said first series of effects to said unit and from the latter to said first punch and for translating said second series of effects to said second unit and from the latter to said second punch, said translating means being responsive to said first and second effects for recurrently shifting the translation of said first series of effects from said first unit to said second punch and said second series of effects from said second unit to said first punch, whereby each punch reproduces a complete order in a deck of cards.

11. An information reproducing system comprising: means for moving a record which includes a plurality of order forms joined in end-to-end relation, each containing on the front and rear thereof indicia conjointly representative of a single order and indicia representative of the end of the front of that form and the rear thereof: first means for scanning the indicia on the front of the moving forms and deriving therefrom a first series of effects representative of a first portion of that order and a first effect representative of the end of the front of a form; second means for concurrently scanning, one order form displaced from said first scanning means, the indicia on the rear of the moving forms and deriving therefrom a second series of effects representative of the remainder of that order and a second effect representative of the end of the rear of the form; first and second means for utilizing said series of effects to reproduce said orders; and means, including first and second register units each including a pair of registers, for translating alternate ones of said first series of effects to individual registers of said first unit and from alternate ones of said registers to said first utilizing means, and for translating alternate ones of said second series of effects to individual registers of said second unit and from alternate ones of said last-mentioned registers to said second utilizing means, said translating means being responsive to said first and second effects for recurrently shifting the translation of said first series of effects to said second utilizing means and said second series of effects to said first utilizing means, whereby each utilizing means reproduces a complete order.

12. An information reproducing system comprising: means for moving a record which includes a plurality of order forms joined in end-to-end relation, each containing on the front and rear thereof indicia conjointly representative of a single order and indicia representative of the end of the front of that form and the rear thereof: first means for scanning the indicia on the front of the moving forms and deriving therefrom a first series of effects representative of a first portion of that order and a first effect representative of the end of the front of a form; second means for concurrently scanning, one order form displaced from said first scanning means, the indicia on the rear of the moving forms and deriving therefrom a second series of effects representative of the remainder of that order and a second effect representative of the end of the rear of the form; first and second means for utilizing said series of effects to reproduce said orders; and means, including first and second register units each including a plurality of registers, for sequentially translating predetermined ones of said first series of effects to predetermined registers of said first unit and for sequentially translating the remaining ones of said first series of effects to the remaining registers of said first unit and from said remaining registers to said first utilizing means, and for sequentially translating predetermined ones of said second series of effects to predetermined ones of said registers of said second unit and for sequentially translating the remaining ones of said second series of effects to the remaining registers of said second unit and from said last-mentioned remaining registers to said second utilizing means, said translating means being responsive to said first and second effects for recurrently shifting the translation of said first series of effects to said second utilizing means and said second series of effects to said first utilizing means, whereby each utilizing means reproduces a complete order.

13. An information reproducing system comprising: a record which includes a plurality of order forms joined in end-to-end relation, each containing on the front and rear thereof first indicia conjointly representative of a single order and second indicia representative of the end of the front of that form and the rear thereof, said first indicia being a printed series of item marks and a plurality of quantity marks which were inserted in a predetermined relation to at least some of said item marks in accordance with a predetermined code to represent the quantities of items ordered; means for moving said record; first means for scanning the indicia on the front of the moving forms and deriving therefrom a first series of effects representative of a first portion of that order and a first effect representative of the end of the front of a form; second means for concurrently scanning, one order form displaced from said first scanning means, the indicia on the rear of the moving forms and deriving therefrom a second series of effects representative of the remainder of that order and a second effect representative of the end of the rear of the form; first and second means for utilizing said series of effects to reproduce said orders; and means, including first and second register units each including a pair of registers, for translating alternate ones of said first series of effects to individual registers of said first unit and from alternate ones of said registers to said first utilizing means, and for translating alternate ones of said second series of effects to individual registers of said second unit and from alternate ones of said last-mentioned registers to said second utilizing means, said translating means being responsive to said first and second effects for recurrently shifting the translation of said first series of effects to said second utilizing means and said second series of effects to said first utilizing means, whereby each utilizing means reproduces a complete order.

14. An information reproducing system comprising: a record which includes a plurality of order forms joined in end-to-end relation, each containing on the front and rear thereof first indicia conjointly representative of a single order and second indicia representative of the end of the front of that form and the rear thereof, said first indicia being a printed series of item marks and a plurality of quantity marks which were inserted in a predetermined relation to at least some of said item marks in accordance with a predetermined code to represent the quantities of items ordered; means for moving said record; first means for optically scanning said item marks and for conductively sensing said quantity marks on the front of the moving forms and deriving therefrom a first series of effects representative of a first portion of that order, and for optically scanning said second indicia on the front of a form and deriving therefrom a first effect representative of the end of the front of a form; second means for concurrently and optically scanning, one order form displaced from said first scanning means, said item marks and for conductively sensing said quantity marks on the rear of the moving forms and deriving therefrom a second series of effects representative of the remainder of that order, and for optically scanning, one order form displaced from said first scanning means, said second indicia on the rear of the displaced form and deriving therefrom a second effect representative of the end of the rear of the form; first and second card punches for utilizing said series of effects to reproduce said orders; and means, including first and second register units each including a pair of registers, for translating alternate ones of said first series of effects to individual registers of said first unit and from alternate ones of said registers to said first punch, and for translating alternate ones of said second series of effects to individual registers of said second unit and from alternate ones of said last-mentioned registers to said second punch, said translating means being responsive to said first and second effects for recurrently shifting the translation of said first series of effects to said second punch and said second series of effects to said first punch, whereby each punch reproduces a complete order in a deck of cards.

References Cited in the file of this patent

UNITED STATES PATENTS 2,963,685    Laurer et al. ______________ Dec. 6, 1960